United States Patent
Ino et al.

(10) Patent No.: US 11,251,446 B2
(45) Date of Patent: Feb. 15, 2022

(54) FUEL CELL SYSTEM

(71) Applicant: Kabushiki Kaisha F.C.C., Hamamatsu (JP)

(72) Inventors: Kentaro Ino, Hamamatsu (JP); Kenji Ohashi, Hamamatsu (JP); Kwangjin Jeong, Hamamatsu (JP); Ryota Hino, Hamamatsu (JP); Satoshi Suzuki, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 0 days.

(21) Appl. No.: 16/950,270

(22) Filed: Nov. 17, 2020

(65) Prior Publication Data

US 2021/0075038 A1 Mar. 11, 2021

Related U.S. Application Data

(63) Continuation of application No. PCT/JP2018/020066, filed on May 24, 2018.

(30) Foreign Application Priority Data

May 18, 2018 (JP) .............................. JP2018-096406

(51) Int. Cl.
*H01M 8/04291* (2016.01)
*H01M 8/1231* (2016.01)
(Continued)

(52) U.S. Cl.
CPC ..... *H01M 8/04291* (2013.01); *H01M 4/8626* (2013.01); *H01M 8/0252* (2013.01);
(Continued)

(58) Field of Classification Search
CPC ........... H01M 8/04291; H01M 8/1231; H01M 4/8626; H01M 8/0252; H01M 8/0618; H01M 2008/1293
See application file for complete search history.

(56) References Cited

U.S. PATENT DOCUMENTS

2011/0117461 A1* 5/2011 Maenishi ............... B01J 8/0469
429/425
2017/0033394 A1* 2/2017 Yamauchi ............. H01M 8/243

FOREIGN PATENT DOCUMENTS

JP 2005-222899 A 8/2005
JP 2010-103009 A 5/2010
(Continued)

OTHER PUBLICATIONS

International Search Report dated Jul. 10, 2018 in corresponding PCT/JP2018/020066.

*Primary Examiner* — Stewart A Fraser
(74) *Attorney, Agent, or Firm* — Harness, Dickey & Pierce, P.L.C.

(57) ABSTRACT

A fuel cell system has a cell (1) that is capable of generating electric power. The cell (1) has a fuel electrode (1a), an air electrode (1b) and an electrolyte (1c). The fuel electrode (1a) is supplied with hydrogen obtained by reforming fuel gas. The air electrode (1b) is supplied with oxygen in the air. The electrolyte (1c) is interposed between the fuel electrode (1a) and the air electrode (1b) to enable oxygen ions to pass through to the fuel electrode (1a). A water vapor retaining mechanism (6) is disposed in a flow path of the fuel gas supplied to the fuel electrode (1a). The mechanism (6) retains water vapor generated in the fuel electrode (1a) during electric power generation by the cell (1). The mechanism (6) enables the water vapor to be mixed with the fuel gas.

8 Claims, 14 Drawing Sheets

(51) Int. Cl.
  *H01M 4/86*   (2006.01)
  *H01M 8/0252*  (2016.01)
  *H01M 8/0612*  (2016.01)
  *H01M 8/124*   (2016.01)

(52) U.S. Cl.
  CPC ....... *H01M 8/0618* (2013.01); *H01M 8/1231* (2016.02); *H01M 2008/1293* (2013.01)

(56) References Cited

FOREIGN PATENT DOCUMENTS

| | | |
|---|---|---|
| JP | 2014-041804 A | 3/2014 |
| JP | 2015-510665 A | 4/2015 |
| WO | WO-2015/170692 A1 | 11/2015 |

\* cited by examiner

[ Fig. 1 ]
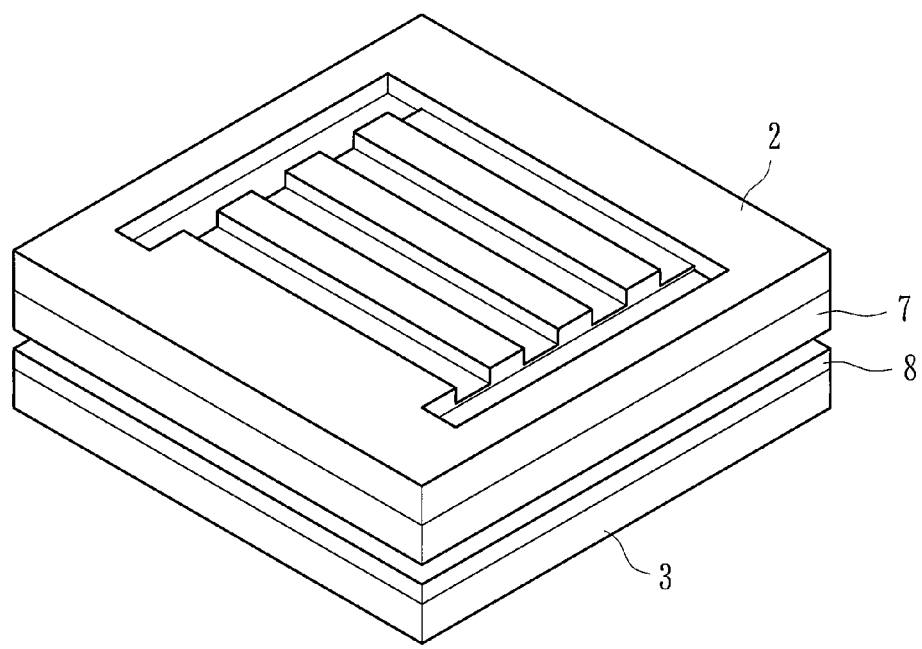
[ Fig. 2 ]
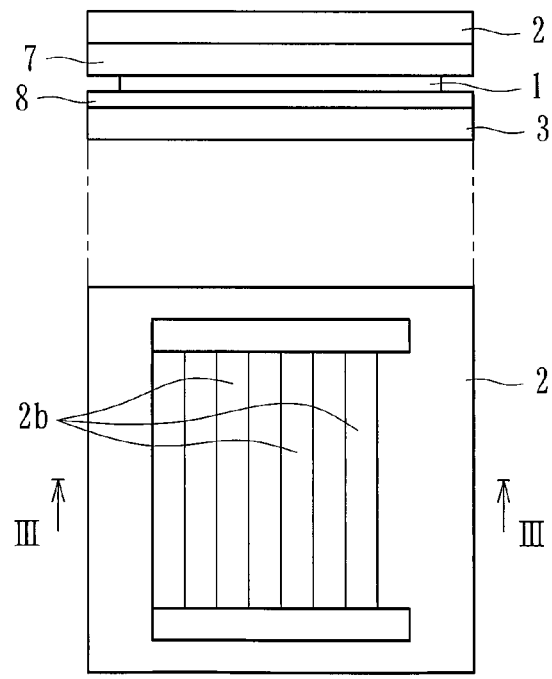

[ Fig. 3 ]
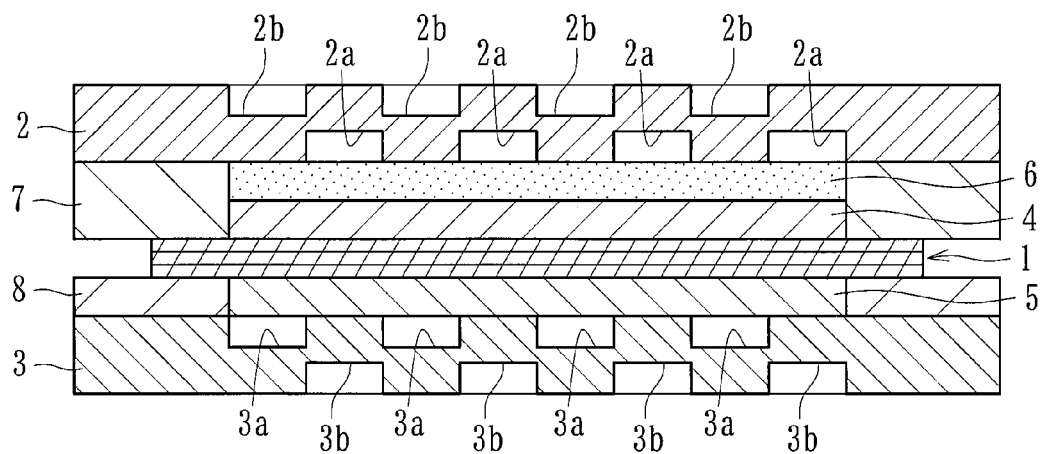
[ Fig. 4 ]
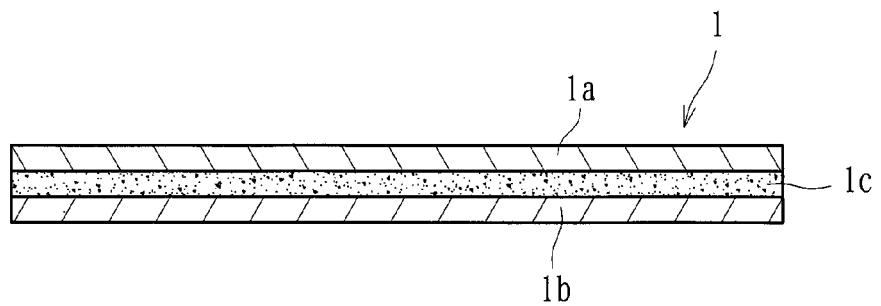

[Fig. 5]
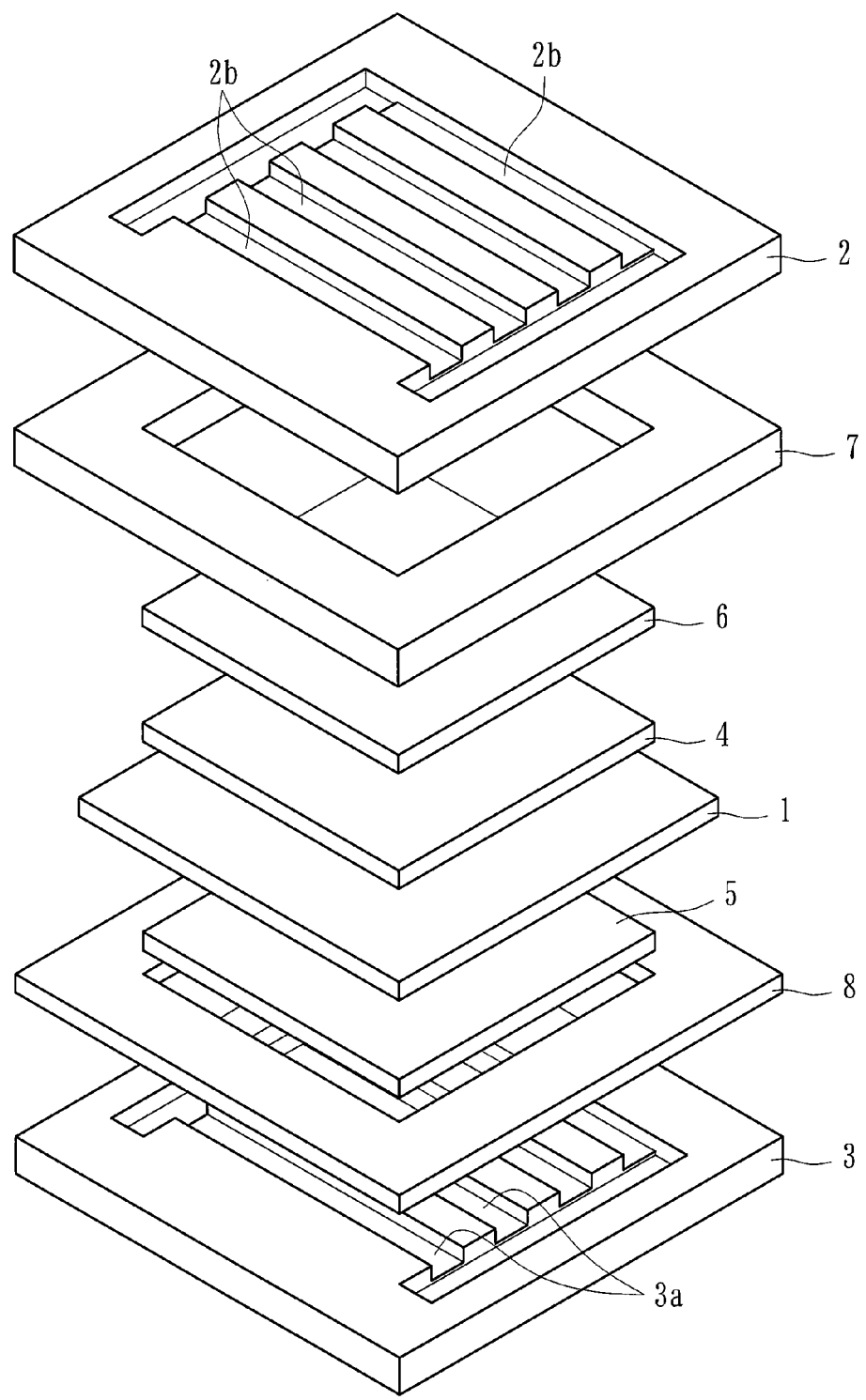

[Fig. 6]
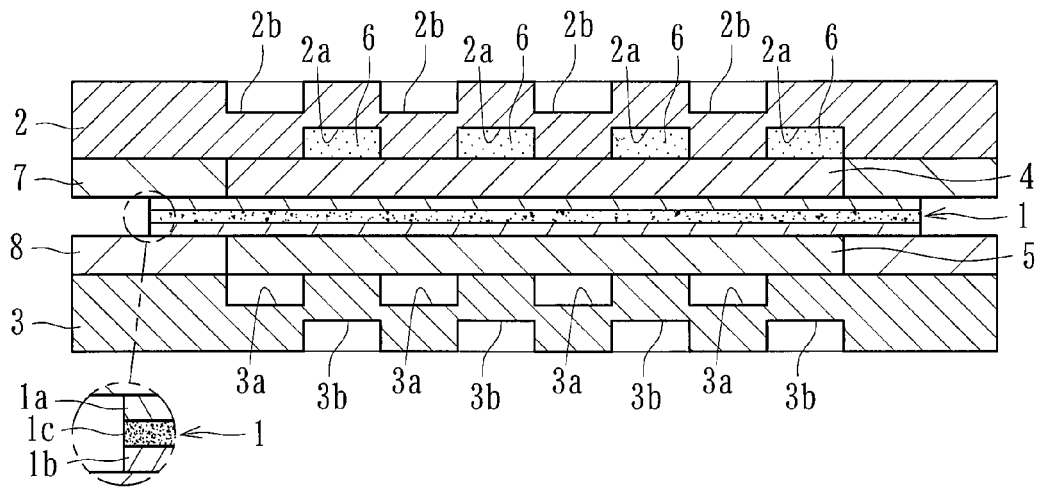
[Fig. 7]
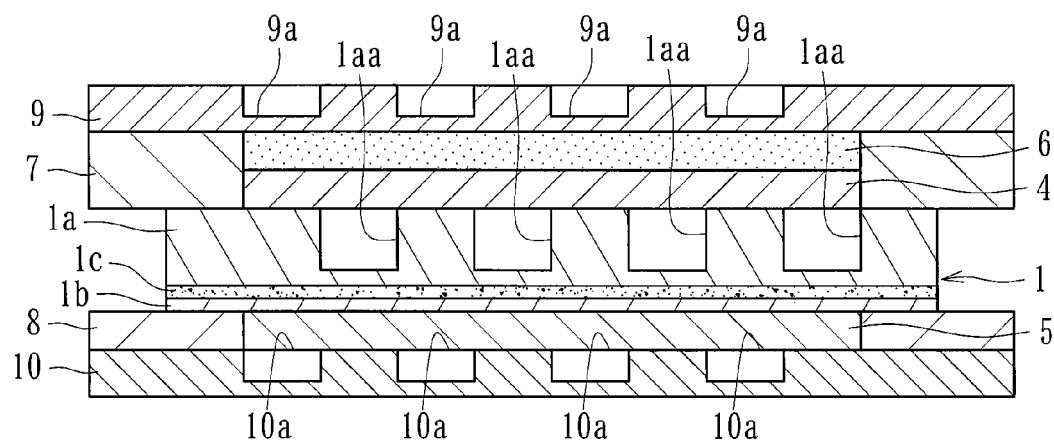
[Fig. 8]
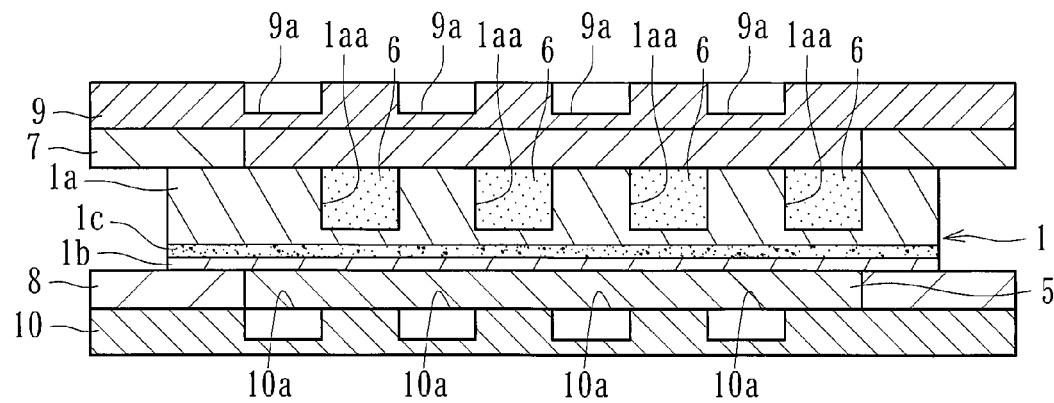

[Fig. 9]
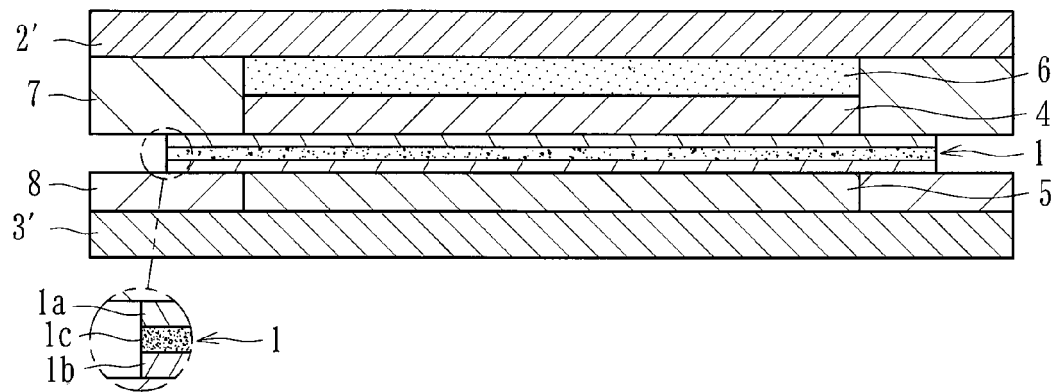

[Fig. 10]
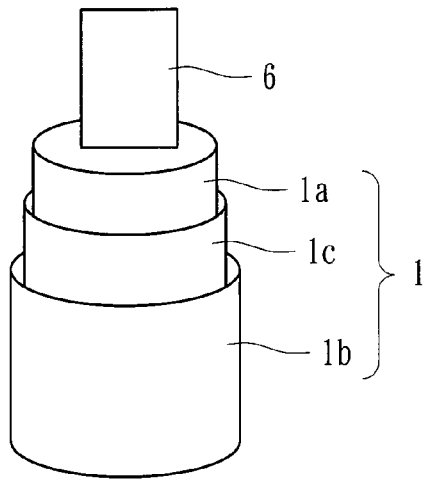
[Fig. 11]
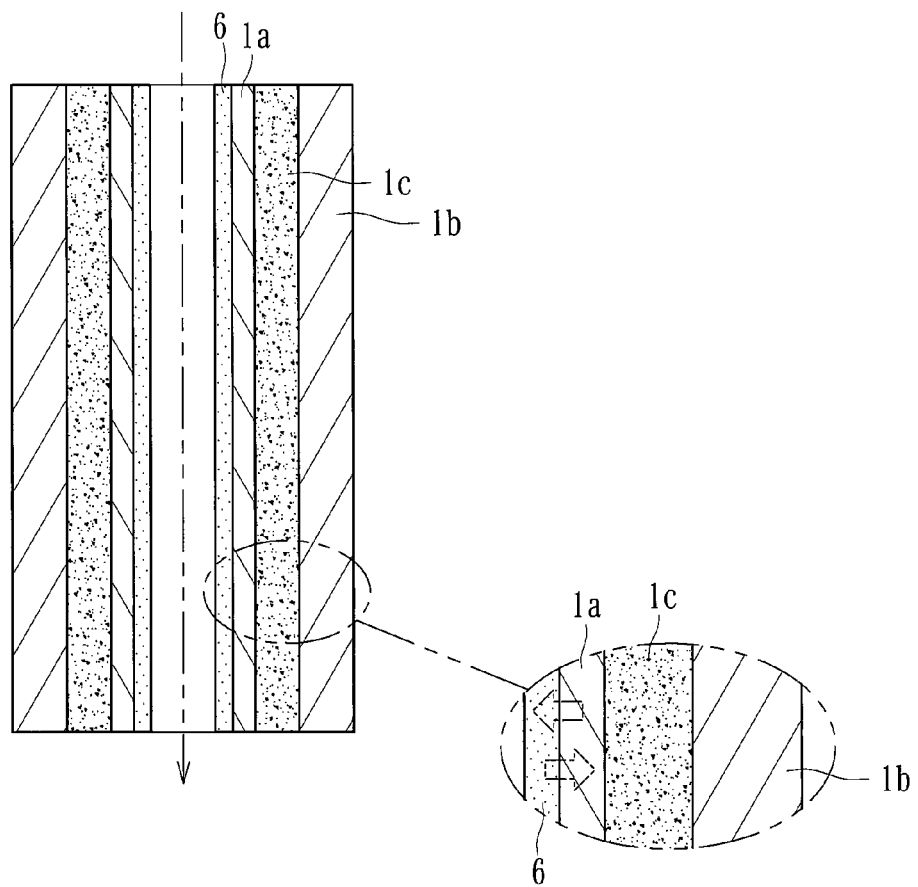

[ Fig. 12 ]
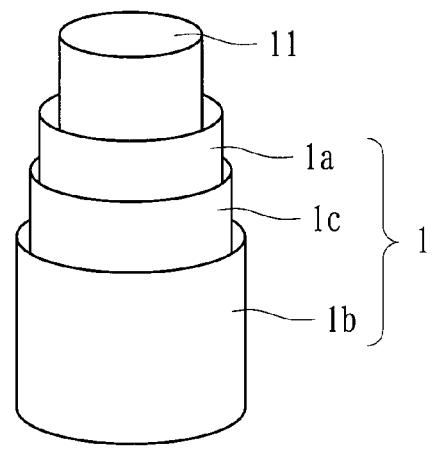
[ Fig. 13 ]
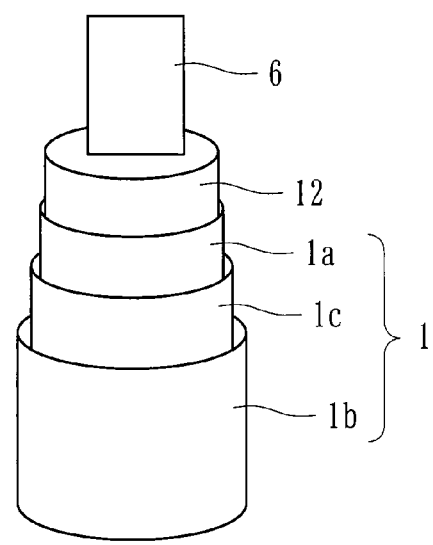

[Fig. 14]
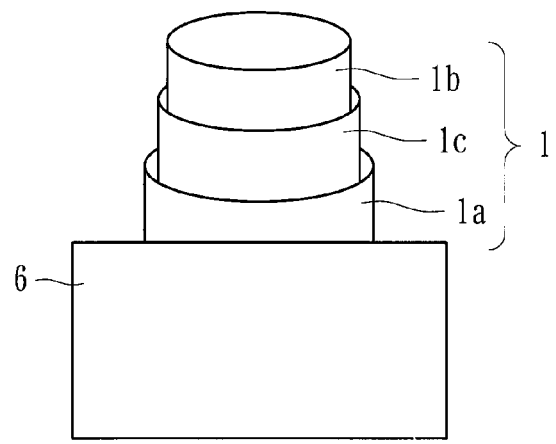
[Fig. 15]
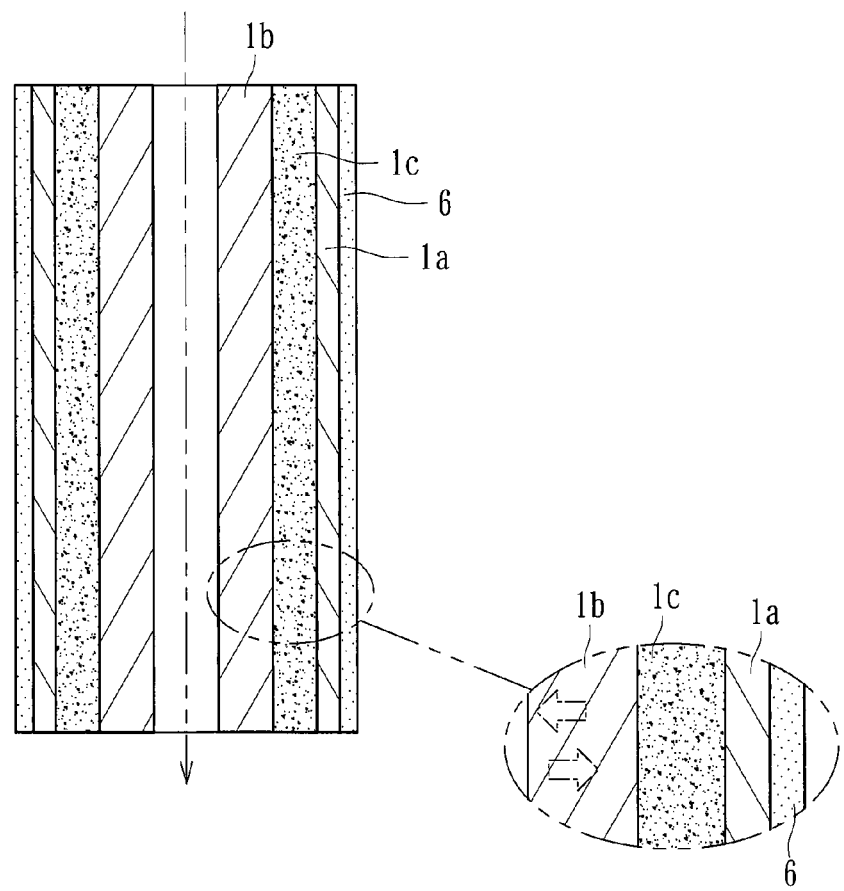

[ Fig. 16 ]
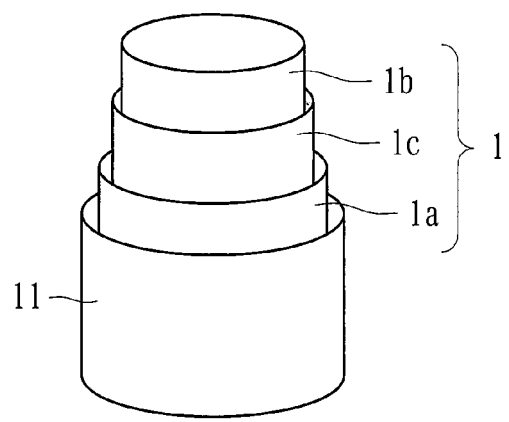
[ Fig. 17 ]
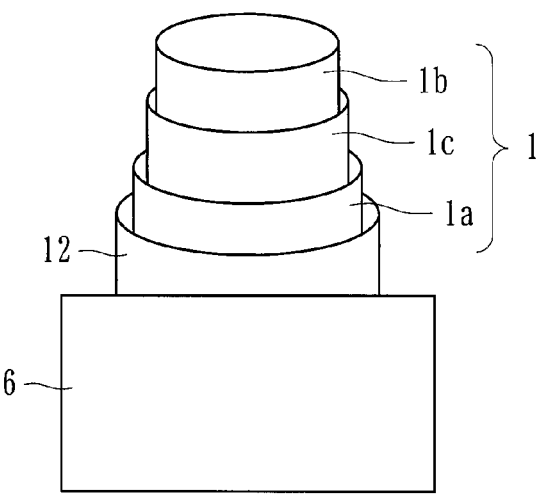

[Fig. 18]
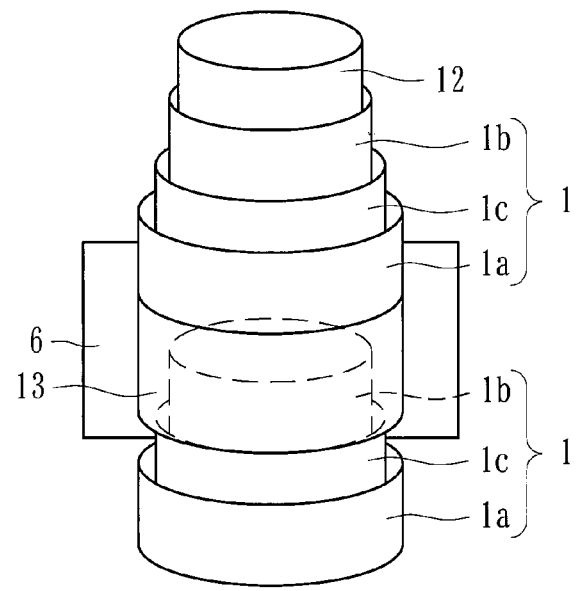
[Fig. 19]
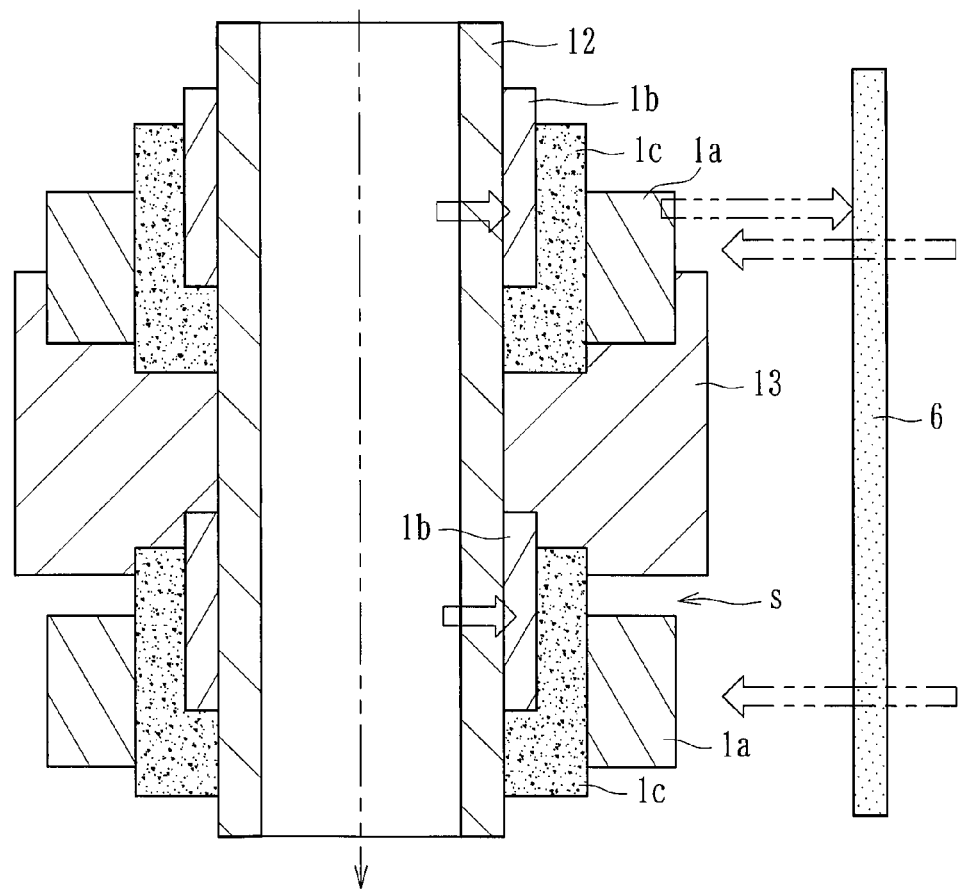

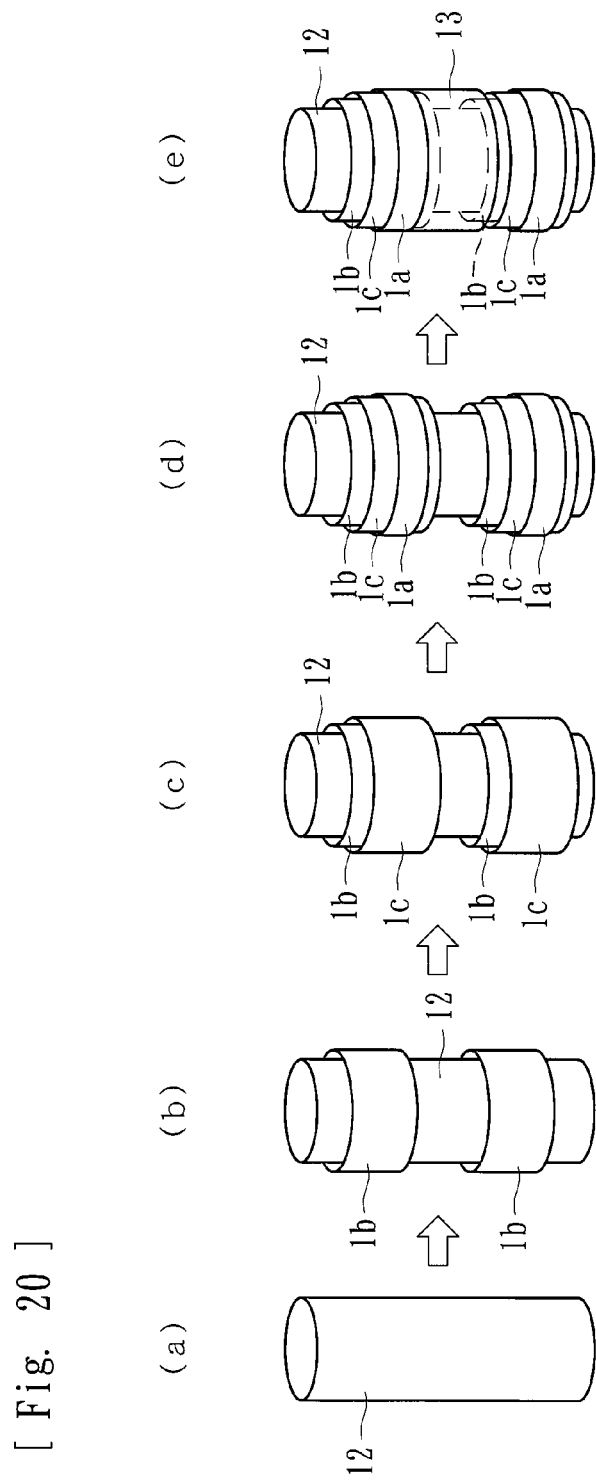
[Fig. 20]

[Fig. 21]
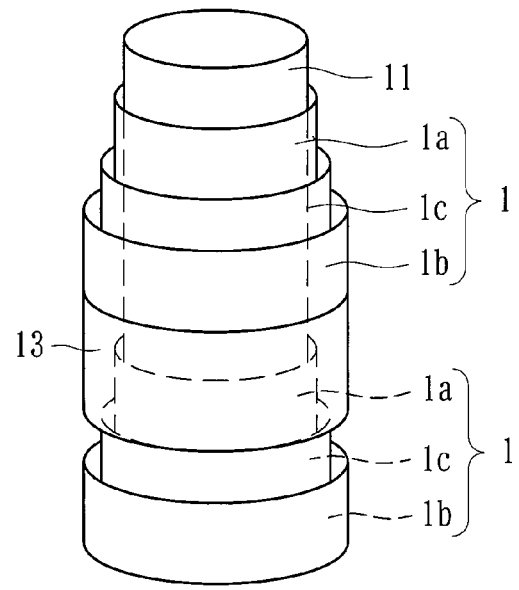
[Fig. 22]
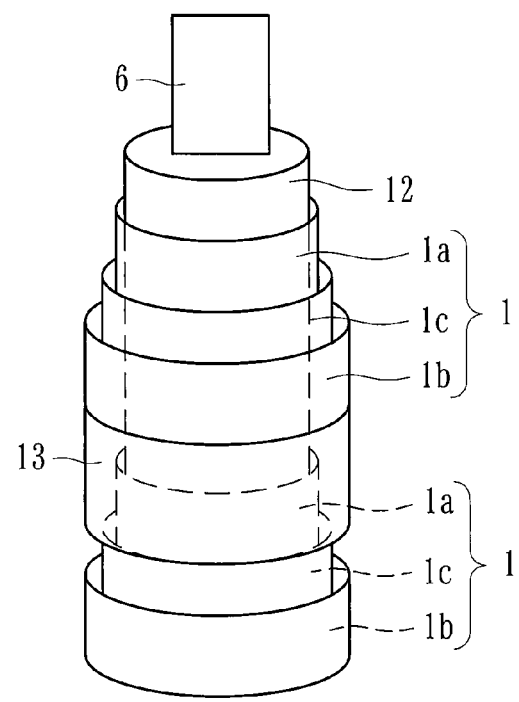

[Fig. 23]
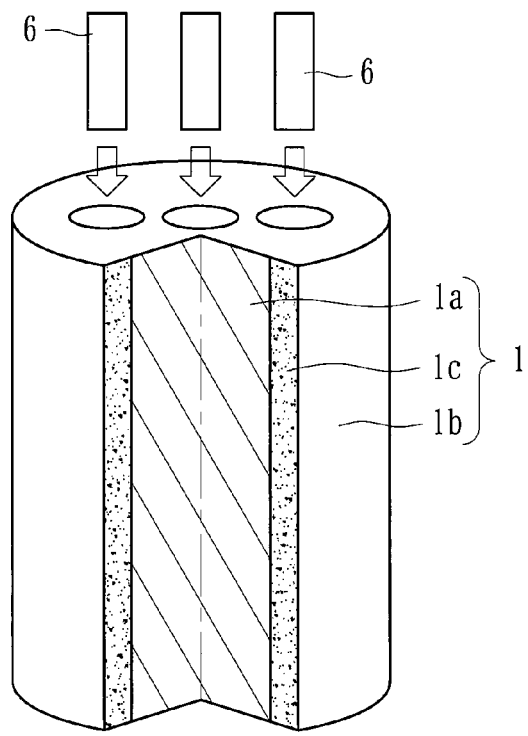
[Fig. 24]
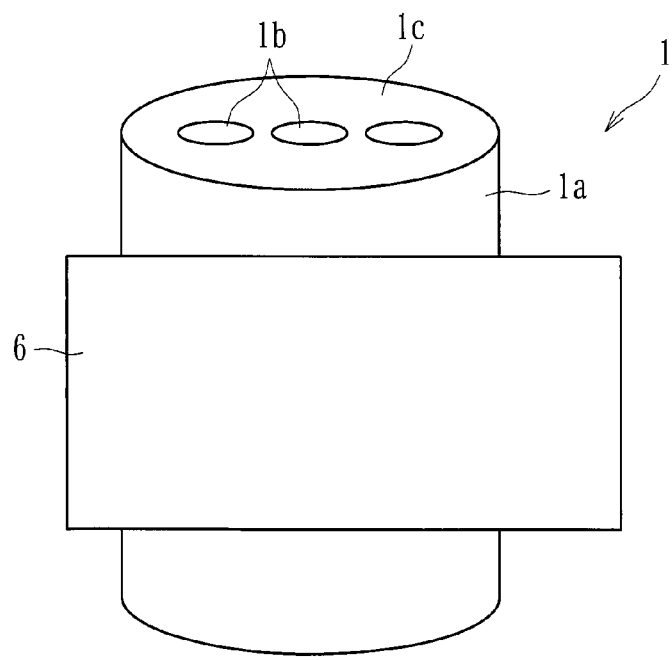

[Fig. 25]
(a)
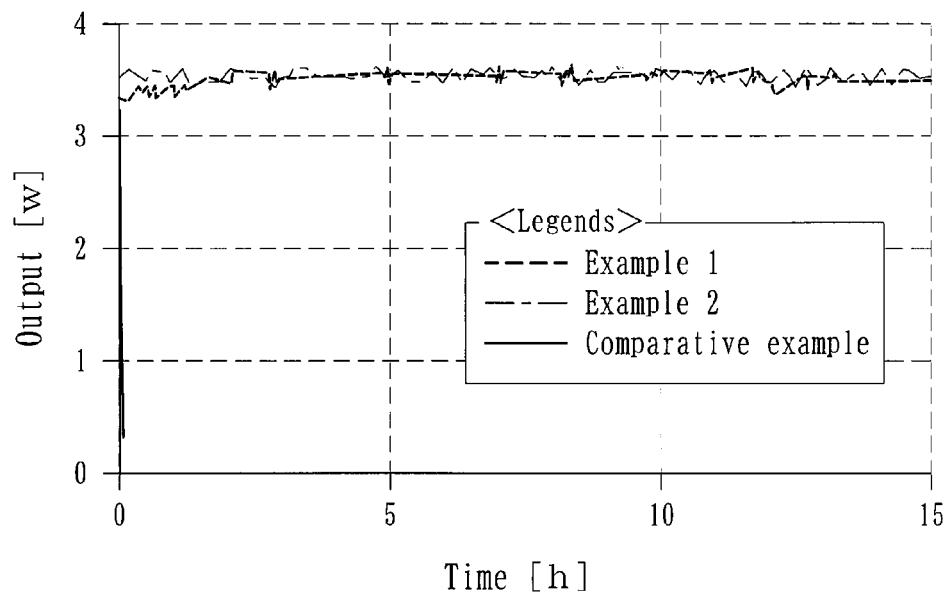
(b)
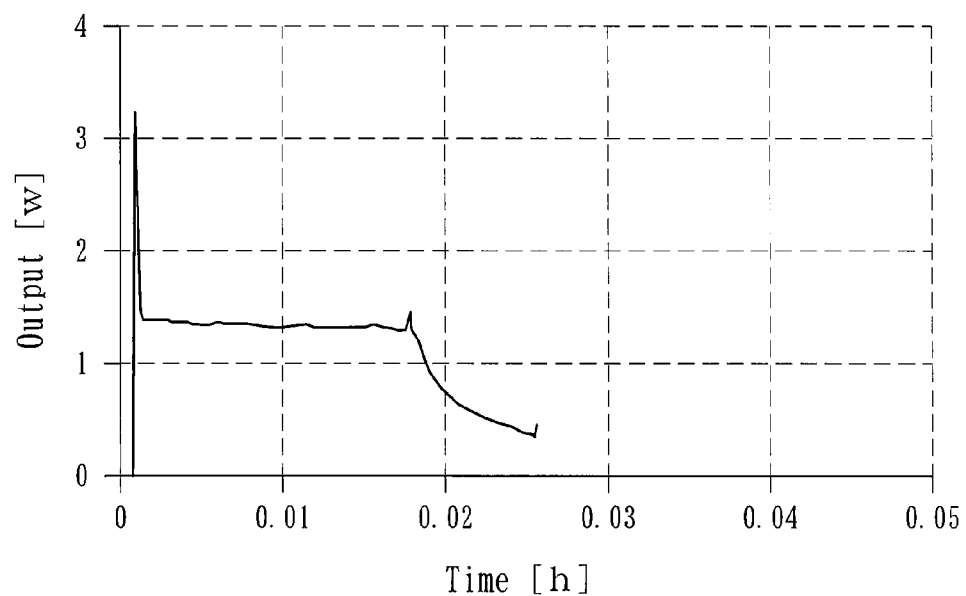

FUEL CELL SYSTEM

CROSS-REFERENCE TO RELATED APPLICATIONS

This application is a continuation of International Application No. PCT/JP2018/020066, filed May 24, 2018, which claims priority to Japanese Application No. 2018-096406, filed May 18, 2018. The disclosures of the above applications are incorporating herein by reference.

FIELD

The present disclosure relates to a fuel cell system including a cell that is capable of generating electric power. The system includes a fuel electrode, an air electrode and an electrolyte. The fuel electrode is supplied with hydrogen obtained by reforming fuel gas. The air electrode is supplied with oxygen from the air. The electrolyte is interposed between the fuel electrode and the air electrode and enables oxygen ions generated in the air electrode to pass through to the fuel electrode.

BACKGROUND

Fuel cell systems use hydrogen or hydrocarbons as fuel and are capable of generating electric power by an electrochemical reaction of the fuel and oxygen. It is known that the fuel cell systems have high energy conversion efficiency. Recently, various types of fuel cell systems have been proposed. When a hydrocarbon is used as the fuel, a reforming reaction is necessary to generate hydrogen from the hydrocarbon. Hydrogen is generated by steam reforming where the hydrocarbon reacts with water. Since the steam reforming reaction is an endothermic reaction, a temperature of 600° C. or higher is necessary. Thus, it is necessary to constantly supply heat of 600° C. or higher. In particular, a fuel cell referred to as a solid oxide fuel cell (SOFC) operates at a temperature of 600° C. or higher. The temperature generated by electric power generation is close to the temperature of the reforming reaction for generating hydrogen from the hydrocarbon used as the fuel. Thus, it is possible to generate hydrogen from the hydrocarbon (through the reforming reaction) by utilizing exhaust heat from the fuel cell. Higher power generation efficiency is achieved.

Therefore, in conventional solid oxide fuel cells, a vaporizer and a reformer are attached separately. In this case, water is supplied from the outside, and hydrogen is produced from a hydrocarbon, such as town gas, and supplied to the fuel cell to generate electric power. It has been contemplated that water generated during electric power generation is reused to increase the power generation efficiency. For example, a system disclosed in Japanese Unexamined Patent Application Publication No. 2005-222899 has a structure where part of the exhaust gas generated during electric power generation is refluxed into the fuel. The water vapor generated during electric power generation is thereby reused. Japanese Unexamined Patent Application Publication No. 2014-41804 discloses a system where exhaust gas containing water vapor, generated during electric power generation, is circulated into a reformer by a pump and mixed with fuel gas to reuse the water vapor for reforming.

SUMMARY

However, in the above conventional techniques, since only part of the exhaust gas can be utilized in Japanese Unexamined Patent Application Publication No. 2005-222899. It is difficult to maintain a sufficient amount of water vapor necessary for reforming. In Japanese Unexamined Patent Application Publication No. 2014-41804, the pump and pipes for collecting and circulating the exhaust gas, a control sensor, etc. are necessary. This is disadvantageous in that the fuel cell system is complicated. The present applicant has focused attention to the fact that water vapor is generated in the fuel electrode during electric power generation by the fuel cell. It is contemplated that the water vapor be retained and used directly for reforming.

The present disclosure has been made in view of the above circumstances. Thus, it is an object to provide a fuel cell system that has a simple structure but can efficiently obtain water vapor for reforming.

The disclosure is a fuel cell system including a cell that is capable of generating electric power. It includes a fuel electrode, an air electrode and an electrolyte. The fuel electrode is supplied with hydrogen obtained by reforming fuel gas. The air electrode is supplied with oxygen in the air. The electrolyte is interposed between the fuel electrode and the air electrode and enables oxygen ions generated from oxygen in the air supplied to the air electrode to pass through to the fuel electrode. The fuel cell system further includes a water vapor retaining mechanism. It is disposed in a flow path of the fuel gas to be supplied to the fuel electrode. Retained water vapor is generated in the fuel electrode during electric power generation by the cell. This enables the water vapor to be mixed with the fuel gas.

In the fuel cell system, the water vapor retaining mechanism includes a reforming catalyst allowing a reaction of the fuel gas to proceed. This generates hydrogen and allows the hydrogen generated by the catalytic reaction, using the reforming catalyst, to be supplied to the fuel electrode.

In the fuel cell system, the water vapor retaining mechanism includes a sheet-shaped member with air permeability and flexibility.

In the fuel cell system, the water vapor retaining mechanism includes a paper-like mechanism including inorganic fibers or organic fibers. It supports a reforming catalyst that enables a reaction of the fuel gas to proceed to generate hydrogen.

The fuel cell system further includes a fuel electrode-side terminal electrically connected to the fuel electrode. It includes a fuel channel through which the fuel flows. An air electrode-side terminal is electrically connected to the air electrode. It includes an air channel through which the air flows. The water vapor retaining mechanism is disposed between the fuel channel of the fuel electrode-side terminal and the fuel electrode.

In the fuel cell system, the water vapor retaining mechanism has electrical conductivity and electrically connects the fuel electrode-side terminal to the fuel electrode.

The fuel cell system further includes a fuel electrode-side terminal electrically connected to the fuel electrode. It includes a fuel channel through which the fuel flows. An air electrode-side terminal is electrically connected to the air electrode. It includes an air channel through which the air flows. The water vapor retaining mechanism is disposed in the fuel channel of the fuel electrode-side terminal.

In the cell of the fuel cell system, the fuel electrode, the electrolyte, and the air electrode are each formed into a tubular shape. The water vapor retaining mechanism is formed into a tubular shape extending along the inner or outer circumferential surface of the fuel electrode.

The water vapor retaining mechanism is disposed in the flow path of the fuel gas to be supplied to the fuel electrode.

It retains the water vapor generated in the fuel electrode during electric power generation by the cell. This enables the water vapor to be mixed with the fuel gas. Therefore, it is unnecessary to supply water from the outside. Thus, there is no need for a separate water vaporizer for vaporizing water. Moreover, the water vapor for reforming can be efficiently obtained using the simple structure.

The water vapor retaining mechanism includes the reforming catalyst that enables the reaction of the fuel gas to proceed to generate hydrogen. This allows the hydrogen, generated by the catalytic reaction using the reforming catalyst, to be supplied to the fuel electrode. Therefore, there is no need for a separate reformer that enables the reaction of the fuel gas to proceed to generate hydrogen. The water vapor for reforming can be efficiently obtained using the simpler structure.

The water vapor retaining mechanism includes the sheet-shaped member with air permeability and flexibility. Therefore, the water vapor retaining mechanism can be easily subjected to processing such as bending and can be easily disposed in any appropriate position in the fuel cell system.

The water vapor retaining mechanism includes the paper-like member including the inorganic fibers or the organic fibers. This supports the reforming catalyst that allows the reaction of the fuel gas to proceed to generate hydrogen. Therefore, the water vapor retaining mechanism, including the reforming catalyst, can be easily formed using, for example, a general-purpose wet paper making method.

The water vapor retaining mechanism is disposed between the fuel channel of the fuel electrode-side terminal and the fuel electrode. Therefore, the water vapor generated in the fuel electrode during electric power generation by the fuel cell can be mixed with the fuel gas reliably and smoothly. Thus, the fuel gas can be reformed efficiently.

The water vapor retaining mechanism has electrical conductivity and electrically connects the fuel electrode-side terminal to the fuel electrode. Therefore, the electrical connection between the fuel electrode-side terminal and the fuel electrode can be reliably established through the water vapor retaining mechanism.

The water vapor retaining mechanism is disposed in the fuel channel of the fuel electrode-side terminal. Therefore, the fuel electrode-side terminal and the fuel electrode can be mounted in contact with each other. The fuel electrode-side terminal and the fuel electrode can be electrically connected to each other in a reliable manner even when the water vapor retaining mechanism does not have electrical conductivity.

The fuel electrode, the electrolyte, and the air electrode of the cell are each formed into a tubular shape. The water vapor retaining mechanism is formed into a tubular shape. It extends along the inner or outer circumferential surface of the fuel electrode. Therefore, the fuel and the air can easily flow using the tubular inner and outer spaces.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a fuel cell system according to a first embodiment.

FIG. 2 is a plan and front view of the fuel cell system of FIG. 1.

FIG. 3 is a cross-sectional view taken along line III-III in FIG. 2.

FIG. 4 is a cross-sectional view of a cell of the fuel cell system.

FIG. 5 is an exploded perspective view of the fuel cell system.

FIG. 6 is a cross-sectional view of a fuel cell system according to another embodiment of the present disclosure with a water vapor retaining mechanism is disposed in a fuel channel of a fuel electrode-side terminal.

FIG. 7 is a cross-sectional view of a fuel cell system according to another embodiment with fuel channel formed in the fuel electrode of the cell.

FIG. 8 is a cross-sectional view of a fuel cell system according to another embodiment with a fuel channel formed in the fuel electrode of the cell, and a water vapor retaining mechanism is disposed in the fuel channel.

FIG. 9 is a cross-sectional view of a fuel cell system according to another embodiment with no channels formed in the fuel electrode-side and air electrode-side terminals.

FIG. 10 is a perspective view of a fuel cell system according to a second embodiment with a water vapor retaining mechanism disposed on the inner circumferential surface of a tubular cell FIG. 11 is a cross-sectional view of the internal structure of the fuel cell system of FIG. 10.

FIG. 12 is a perspective view of a fuel cell system according to another embodiment with a water vapor retaining mechanism, with improved strength, disposed on the fuel electrode.

FIG. 13 is a perspective view of a fuel cell system according to another embodiment with the water vapor retaining mechanism and a support disposed on the fuel electrode.

FIG. 14 is a perspective view of a fuel cell system according to another embodiment with a water vapor retaining mechanism disposed on the outer circumferential surface of the cell.

FIG. 15 is a cross-sectional view of the internal structure of the fuel cell system of FIG. 14.

FIG. 16 is a perspective view of a fuel cell system according to another embodiment with a water vapor retaining mechanism, with improved strength, is disposed on the outer circumferential surface of the cell.

FIG. 17 is a perspective view of a fuel cell system according to another embodiment with support and a water vapor retaining mechanism disposed on the outer circumferential surface of the cell.

FIG. 18 is a perspective view of a fuel cell system according to another embodiment with a support disposed on the inner circumferential surfaces of cells connected in series, and a water vapor retaining mechanism disposed on the outer circumferential surfaces of the cells.

FIG. 19 is a cross-sectional view of the electrical connection state of the fuel cell system.

FIG. 20 is a schematic illustrations of a method for producing the fuel cell system.

FIG. 21 is a perspective view of a fuel cell system according to another embodiment with a water vapor retaining mechanism with improved strength, disposed on the inner circumferential surfaces of cells connected in series.

FIG. 22 is a perspective view of a fuel cell system according to another embodiment with a support and a water vapor retaining mechanism disposed on the inner circumferential surfaces of cells connected in series.

FIG. 23 is a perspective view (partially exploded in the axial direction) of a fuel cell system according to another embodiment with a plurality of holes formed in the fuel electrode of a cell, and a water vapor retaining mechanism disposed in the holes).

FIG. 24 is a perspective view of a fuel cell system according to another embodiment with a plurality of holes formed in the air electrode of a cell, and a water vapor retaining mechanism disposed on the outer circumferential surface of the cell.

FIG. 25 illustrates graphs of experimental results showing technical superiority of the present disclosure.

DETAILED DESCRIPTION

Hereafter, embodiments of the present disclosure will be described in detail with reference to the drawings.

As shown in FIGS. 1 to 5, a fuel cell system according to a first embodiment includes a cell 1 that is capable of generating electric power. The cell 1 includes a fuel electrode 1a, an air electrode 1b and an electrolyte 1c. The fuel electrode 1a is supplied with hydrogen obtained by reforming fuel gas. The air electrode 1b is supplied with oxygen in the air. The electrolyte 1c is interposed between the fuel electrode 1a and the air electrode 1b. It enables oxygen ions generated in the air electrode 1b to pass through to the fuel electrode 1a. The fuel cell system further includes a fuel electrode-side terminal 2 (separator), an air electrode-side terminal 3 (separator), a fuel electrode-side current collector 4, an air electrode-side current collector 5, and a water vapor retaining mechanism 6. In the present embodiment, the disclosure is applied to a fuel cell system including a single cell with a flat plate structure.

The cell 1 is called a solid oxide fuel cell (SOFC) and is applied particularly to a fuel cell system of the internal reforming type. The cell 1 has a stacked structure where the solid electrolyte 1c is held between the fuel electrode 1a (anode) and the air electrode 1b (cathode). It is formed entirely of solid materials. In a high-temperature type fuel cell system, such as the solid oxide fuel cell forming the cell 1, the temperature generated during electric power generation by the cell is close to the temperature of a reforming reaction. Therefore, hydrogen can be generated from a hydrocarbon by utilizing exhaust heat from the fuel cell (through the reforming reaction). Thus, high power generation efficiency is achieved.

The electrolyte 1c of the cell 1 is made of an oxygen ion conductive material, such as a ceramic $ZrO_2$, $CeO_2$, or a Ga-based oxide. The fuel electrode 1a is formed in contact with one surface of the electrolyte 1c. The air electrode 1b is formed in contact with the other surface. The fuel electrode 1a (anode) is prepared, for example, as an electrode containing a raw material of the electrolyte 1c. It is obtained by mixing a catalyst (such as NiO) and a pore forming agent and firing the mixture. Hydrogen, obtained by reforming the fuel gas, is supplied to the fuel electrode 1a. The fuel electrode 1a is electrically connected to the fuel electrode-side terminal 2 (separator) through the fuel electrode-side current collector 4 and the water vapor retaining mechanism 6. The air electrode 1b (cathode) of the cell 1 is formed, for example, as an electrode containing an oxide of a metal such as lanthanum, strontium, or cobalt etc. Oxygen in the air is supplied to the air electrode 1b. The air electrode 1b is electrically connected to the air electrode-side terminal 3 (separator) through the air electrode-side current collector 5.

In the air electrode 1b, oxygen ions are generated from oxygen in the air and supplied to the electrode 1b. Electrons and the generated oxygen ions pass through the electrolyte 1c toward the fuel electrode 1a. In the fuel electrode 1a, hydrogen, obtained by reforming the fuel gas, reacts with the oxygen ions that have passed through the electrolyte 1c. Water ($H_2O$) is generated. The electrons generated flow through an unillustrated load to the air electrode 1b, so that electric power can be generated.

Since the reaction temperature of the solid oxide fuel cell is high, i.e., 600° C. or higher, all the water ($H_2O$) is generated as water vapor. The fuel gas is composed of a hydrocarbon-based gas such as town gas or LP gas (methane, ethane, propane, or butane). It undergoes a catalytic reaction in the presence of a reforming catalyst supported on the water vapor retaining mechanism 6. Hydrogen can thereby be generated. Therefore, in the fuel electrode 1a, carbon monoxide (CO) and carbon dioxide ($CO_2$) are generated in addition to water ($H_2O$). The fuel gas supplied may be, in addition to the hydrocarbon-based gases, gases composed of alcohols and ethers.

The fuel electrode-side terminal 2 is formed from a heat resistant metal plate having electrical conductivity. A fuel channel 2a, for flow of the fuel, is formed on the inner side of the fuel electrode-side terminal 2 (on the inner side of the single cell). The fuel electrode-side terminal 2 is electrically connected to the fuel electrode 1a. The fuel channel 2a includes a plurality of grooves, (may include one groove), formed in the fuel electrode-side terminal 2. This forms a passage through which the fuel can flow with the fuel electrode-side terminal 2 stacked on the water vapor retaining mechanism 6. A fuel electrode-side gasket 7 is attached between the cell 1 and the fuel electrode-side terminal 2. The fuel electrode-side gasket 7 prevents the fuel gas, flowing through the fuel channel 2a, from leaking to the outside. Grooves 2b, similar to the fuel channel 2a, are formed on the outer side of the fuel electrode-side terminal 2. When single cells are staked to form a stack, the grooves 2b in a single cell form an air channel for an adjacent single cell.

The air electrode-side terminal 3 is formed from a heat resistant metal plate with electric conductivity. An air channel 3a, for flowing air, is formed on the inner side of the air electrode-side terminal 3, on the inner side of the single cell. The air electrode-side terminal 3 is electrically connected to the air electrode 1b. The air channel 3a includes a plurality of grooves, may include one groove, formed in the air electrode-side terminal 3. This forms a passage where the air can flow with the air electrode-side terminal 3 stacked on the air electrode-side current collector 5. An air electrode-side gasket 8 is attached between the cell 1 and the air electrode-side terminal 3. The air electrode-side gasket 8 prevents the air flowing through the air channel 3a from leaking to the outside. Grooves 3b, similar to the air channel 3a, are formed on the outer side of the air electrode-side terminal 3. When single cells are stacked to form a stack, the grooves 3b in a single cell form a fuel channel for an adjacent single cell.

The fuel electrode-side current collector 4 includes an electrically conductive member interposed between the fuel electrode 1a of the cell 1 and both the fuel electrode-side terminal 2 and the water vapor retaining mechanism 6. It is used to maintain good electrical contact between the fuel electrode 1a and the fuel electrode-side terminal 2. The fuel electrode-side current collector 4 is formed, for example, from a metal mesh, a metal sponge, a porous metal, etc.

The air electrode-side current collector 5 includes an electrically conductive member interposed between the air electrode 1b of the cell 1 and the air electrode-side terminal 3. It is used to maintain good electrical contact between the air electrode 1*b* and the air electrode-side terminal 3. The air electrode-side current collector 5 is formed, for example, from a metal mesh, a metal sponge, a porous metal, etc.

The water vapor retaining mechanism 6 is disposed in a flow path of the fuel gas to be supplied to the fuel electrode 1*a*. It is between the fuel channel 2*a* of the fuel electrode-side terminal 2 and the fuel electrode 1*a* of the cell 1, in the present embodiment. It retains water vapor generated in the fuel electrode 1*a* during electric power generation by the cell 1. It allows the water vapor to be mixed with the fuel gas supplied to the fuel channel 2*a*. The water vapor retaining mechanisms 6, in the present embodiment, includes the reforming catalyst. This allows a reaction of the fuel gas to proceed to generate hydrogen. The hydrogen generated through the catalytic reaction, using the reforming catalyst, can be supplied to the fuel electrode 1*a*.

More specifically, the water vapor retaining mechanism 6, in the present embodiment, includes a sheet-shaped member with air permeability and flexibility. It is formed from a paper-like member having inorganic fibers or organic fibers. It supports the reforming catalyst that enables the reaction of the fuel gas to proceed to generate hydrogen. For example, organic and inorganic fibers, such as ceramic fibers and pulp, are mixed with a prescribed amount of water. A complex oxide of magnesium and aluminum is added that serves as a support. Then a cationic polymer, an alumina sol, and a polymer flocculant are added. The mixture is subjected to paper making, pressed, and dried to obtain a sheet-shaped member with air permeability and flexibility. The obtained sheet-shaped member is fired at 600 to 850° C. for 1 to 24 hours. It is immersed in a n aqueous solution containing metal ions used as the catalyst for 0.1 to 4 hours. It is dried, and fired at 600 to 800° C. for 1 to 24 hours. The water vapor retaining mechanism 6 can thereby be obtained. The aqueous solution containing metal ions used as the catalyst can be prepared by selecting at least one from Ni nitrate, Ni sulfate, Ni chloride, Ru nitrate, Ru sulfate, Ru chloride, Rh nitrate, Rh sulfate, Rh chloride, etc. The firing temperature of the sheet-shaped member is preferably 700° C. to 800° C. The firing time is preferably in the range of 2 to 10 hours.

The thus-obtained water vapor retaining mechanism 6 includes a paper-like member that uses the complex oxide of magnesium and aluminum as the support that supports the catalyst metal such as Ni, Ru, or Rh. The reforming catalyst enables the reaction of the fuel gas to proceed to generate hydrogen. For example, the water vapor retaining mechanism 6 has a thickness of preferably about 0.1 to about 1.0 (mm) and a porosity of preferably about 70 to about 90(%), and the amount of the catalyst metal is preferably about 2 to 9.5 (mg/cm$^2$). A porosity of less than 70% is not preferable because the fuel gas is unlikely to diffuse and pressure loss increases. A porosity of more than 90% is not preferable because the contact between the catalyst and the fuel gas is reduced and the catalytic performance decreases. A catalyst metal amount of less than 2 mg/cm$^2$ is not preferable because sufficient catalytic performance is not obtained. A catalyst metal amount of more than 9.5 mg/cm$^2$ is not preferable because sintering of the catalyst particles occurs and the particle diameter increases. In this case, the catalytic performance commensurate with the amount of the catalyst metal added is not obtained. As the paper thickness decreases, the volume of the fuel cell system itself decreases. However, a paper thickness of 0.1 mm or less is not preferable because the porosity and the catalyst metal amount tend to be nonuniform. A paper thickness of 1.0 mm or more is not preferable because the volume occupied by the paper increases and the volume of the fuel cell system itself increases.

The fuel cell system according to the present embodiment is obtained as follows. As shown in FIG. 5, the fuel electrode-side gasket 7, the water vapor retaining mechanism 6, and the fuel electrode-side current collector 4 are mounted on one surface of the fuel electrode-side terminal 2. The air electrode-side gasket 8 and the air electrode-side current collector 5 are mounted on one surface of the air electrode-side terminal 3. The fuel electrode-side terminal 2 assembly and the air electrode-side terminal 3 assembly are joined with the cell 1 interposed therebetween to thereby obtain a single cell. The required number of single cells are stacked.

Preferably, the water vapor retaining mechanism 6 has electrical conductivity and electrically connects the fuel electrode-side terminal 2 to the fuel electrode 1*a*. The water vapor retaining mechanism 6 may be formed into a mesh shape to further improve the electrical connection and air permeability. The water vapor retaining mechanism 6 is formed from an electrically conductive material that electrically connects the fuel electrode-side terminal 2 to the fuel electrode 1*a* as described above. Thus, the electrical connection between the fuel electrode-side terminal and the fuel electrode can be reliably established through the water vapor retaining mechanism. The water vapor retaining mechanism 6 is formed from the electrically conductive material that electrically connects the fuel electrode-side terminal 2 to the fuel electrode 1*a*. Thus, the fuel electrode-side current collector 4 can be omitted.

As shown in FIG. 6, a water vapor retaining mechanism 6 may be disposed in the fuel channel 2*a* of the fuel electrode-side terminal 2. The water vapor retaining mechanism 6 is opposed in the fuel channel 2*a* of the fuel electrode-side terminal 2 as described above. Thus, the fuel electrode-side terminal 2 and the fuel electrode 1*a* can be mounted in contact with each other. The fuel electrode-side terminal 2 and the fuel electrode 1*a* can be electrically connected in a reliable manner even when the water vapor retaining mechanism 6 has no electrical conductivity.

As shown in FIG. 7, a fuel channel 1*aa* may be formed in the fuel electrode 1*a* of the cell 1. The fuel gas may be caused to flow through the fuel channel 1*aa* and supplied to the fuel electrode 1*a*. Moreover, as shown in FIG. 8, a water vapor retaining mechanism 6 may be disposed in the fuel channel 1*aa* formed in the fuel electrode 1*a*. In these cases, grooves may be formed in an air electrode-side terminal 10 only on the inner side of the single cell to form an air channel 10*a*. Grooves may be formed in a fuel electrode-side terminal 9 only on the outer side of the single cell. When single cells are stacked, the grooves in the fuel electrode-side terminal 9 of a single cell serves as an air channel for an adjacent single cell.

As shown in FIG. 9, no grooves may be formed in a fuel electrode-side terminal 2'. The fuel gas may be caused to flow only through a portion where the fuel electrode-side current collector 4 and the water vapor retaining mechanism 6 are disposed. A space is surrounded by the fuel electrode-side terminal 2', the fuel electrode 1*a* of the cell 1, and the fuel electrode-side gasket 7. Moreover, no grooves may be formed in an air electrode-side terminal 3'. The air may be caused to flow only through a portion where the air electrode-side current collector 5 is disposed. A space is surrounded by the air electrode-side terminal 3', the air electrode 1*b* of the cell 1, and the air electrode-side gasket 8).

Next, a fuel cell system according to a second embodiment will be described.

As shown in FIGS. 10 and 11, in the fuel cell system according to the second embodiment, a fuel electrode 1a, an electrolyte 1c, and an air electrode 1b form a cell 1. Each are formed into a tubular shape. A water vapor retaining mechanism 6 is formed into a tubular shape. It extends along the inner circumferential surface of the fuel electrode 1a. The fuel cell system according to the present embodiment includes an unillustrated fuel electrode-side current collector and an unillustrated air electrode-side current collector that are similar to those in the first embodiment. Detailed description of the same components as those in the first embodiment will be omitted.

As shown in FIG. 11, in the cell 1 in the fuel cell system, the tubular fuel electrode 1a is disposed on the inner side. The tubular air electrode 1b is disposed on the outer side. The electrolyte 1c is disposed between the fuel electrode 1a and the air electrode 1b. The tubular water vapor retaining mechanism 6 is attached along the inner circumferential surface of the fuel electrode 1a. The fuel gas is caused to flow on the inner side. The air is caused to flow on the outer side. In the air electrode 1b, oxygen ions are generated from oxygen in the air and supplied to the air electrode 1a. Electrons and the generated oxygen ions pass through the electrolyte 1c toward the fuel electrode 1a. In the fuel electrode 1a, hydrogen, obtained by reforming the fuel gas, reacts with the oxygen ions that have passed through the electrolyte 1c. Water ($H_2O$) is generated. The electrons generated flow through an unillustrated load into the air electrode 1b, and electric power can thereby be generated.

The water vapor retaining mechanism 6 in the present embodiment is disposed in a flow path of the fuel gas to be supplied to the fuel electrode 1a (on the inner side of the fuel electrode 1a in the present embodiment). The retainer mechanism retains the water vapor generated in the fuel electrode 1a during electric power generation by the cell 1. This allows the water vapor to be mixed with the supplied fuel gas. The water vapor retaining mechanism 6 in the present embodiment includes a reforming catalyst that allows the reaction of the fuel gas to proceed to generate hydrogen. It supplies the hydrogen, generated by the catalytic reaction using the reforming catalyst, to the fuel electrode 1a, as in the first embodiment. The details of the water vapor retaining mechanism 6 are the same as those in the first embodiment.

As shown in FIG. 12, instead of the water vapor retaining mechanism 6, a water vapor retaining mechanism 11, with improved strength, may be attached along the inner circumferential surface of the fuel electrode 1a. Alternatively, as shown in FIG. 13, a support 12 having the required strength and the water vapor retaining mechanism 6 may be attached along the inner circumferential surface of the fuel electrode 1a. When single cells in any of the above fuel cell systems are stacked or bundled, series connection can be established by exposing necessary electrodes and bringing the exposed electrode into contact with each other. Parallel connection can be established by connecting wiring lines.

As shown in FIGS. 14 and 15, a tubular fuel electrode 1a may be disposed on the outer side. A tubular electrode 1b may be disposed on the inner side. An electrolyte 1c may be disposed between the fuel electrode 1a and the air electrode 1b. A tubular water vapor retaining mechanism 6 may be attached along the outer circumferential surface of the fuel electrode 1a. In this case, the fuel gas is caused to flow on the outer side. The air is caused to flow on the inner side. In the air electrode 1b, oxygen ions are generated from oxygen in the supplied air. Electrons and the generated oxygen ions pass through the electrolyte 1c toward the fuel electrode 1a. In the fuel electrode 1a, hydrogen obtained by reforming the fuel gas, reacts with the oxygen ions that have passed through the electrolyte 1c. Water ($H_2O$) is generated. The electrons generated flow through an unillustrated load to the air electrode 1b. Electric power can be generated.

The water vapor retaining mechanism 6 in this case is disposed in a flow path of the fuel gas to be supplied to the fuel electrode 1a, on the outer side of the fuel electrode 1a in the present embodiment. The retaining mechanism retains the water vapor generated in the fuel electrode 1a during electric power generation by the cell 1. It allows the water vapor to be mixed with the supplied fuel gas. The water vapor retaining mechanism 6 in the present embodiment includes a reforming catalyst that allows the reaction of the fuel gas to proceed to generate hydrogen. The hydrogen, generated by the catalytic reaction using the reforming catalyst, can be supplied to the fuel electrode 1a, as in the first embodiment. The details of the water vapor retaining mechanism 6 are the same as those in the first embodiment.

As shown in FIG. 16, instead of the water vapor retaining mechanism 6, a water vapor retaining mechanism 11 with improved strength, may be attached along the outer circumferential surface of the fuel electrode 1a. Alternatively, as shown in FIG. 17, a support 12 having the required strength and a water vapor retaining mechanism 6 may be attached along the outer circumferential surface of the fuel electrode 1a. When single cells in any of the above fuel cell systems are stacked or bundled, series connection can be established by exposing necessary electrodes and bringing the exposed electrode into contact with each other. Parallel connection can be established by connecting wiring lines.

As shown in FIGS. 18 and 19, a tubular fuel electrode 1a, a tubular electrolyte 1c, and a tubular air electrode 1b may be formed in each of upper and lower portions of a tubular support 12. Each cell 1 may include the air electrode 1b disposed on the inner side and the fuel electrode 1a disposed on the outer side. A tubular water vapor retaining mechanism 6 may be attached along the outer circumferential surface of the upper cell 1 and the outer circumferential surface of the lower cell 1. An electrically conductive terminal 13 (interconnector) may be attached to electrically connect the fuel electrode 1a of the upper cell 1 to the air electrode 1b of the lower cell 1. In this case, a gap s, an insulator may be present in the gap, may be formed at a desired position to prevent electrical continuity between the fuel electrode 1a of the upper cell 1 and the fuel electrode 1a of the lower cell 1 and between the air electrode 1b of the upper cell 1 and the air electrode 1b of the lower cell 1.

A fuel cell system where a plurality of single cells are formed as described above is produced as shown in FIG. 20. Tubular air electrodes 1b are formed on opposite end portions of a tubular support 12 (FIG. 20(b)). The tubular upper and lower electrolytes 1c are formed on the outer side of the air electrodes 1b (FIG. 20(c)). The tubular upper and lower fuel electrodes 1a are formed on the outer side of the electrolytes 1c. Thus, part of the air electrodes 1b and part of the electrolytes 1c are exposed to the outside (FIG. 20(d)). A tubular terminal 13 is attached to extend from the outer circumferential surface of the upper fuel electrode 1a to the outer circumferential surface of the lower fuel electrode 1a. Thus, the upper fuel electrode 1a is electrically connected to the lower air electrode 1b (FIG. 20(e)). A tubular water vapor retaining mechanism 6 is attached along the outer circumferential surface. A fuel cell system including the vertical pair of cells 1 can thereby be obtained.

As shown in FIG. 21, a tubular fuel electrode 1a, a tubular electrolyte 1c, and a tubular air electrode 1b may be formed in each of upper and lower portions of a tubular water vapor retainer 11 with improved strength. Each cell 1 may include the air electrode 1b disposed on the outer side and the fuel electrode 1a disposed on the inner side. An electrically conductive terminal 13 (interconnector) may be attached to electrically connect the air electrode 1b of the upper cell 1 to the fuel electrode 1a of the lower cell 1.

As shown in FIG. 22, a tubular fuel electrode 1a, a tubular electrolyte 1c, and a tubular air electrode 1b may be formed in each of upper and lower portions of a tubular support 12. Each cell 1 may include the air electrode 1b disposed on the outer side and the fuel electrode 1a disposed on the inner side. A tubular water vapor retaining mechanism 6 may be attached inside the support 12. An electrically conductive terminal 13 (interconnector) may be attached to electrically connect the air electrode 1b of the upper cell 1 to the fuel electrode 1a of the lower cell 1.

FIG. 23 shows a cylindrical single cell including an outer air electrode 1b, an inner fuel electrode 1a, and an electrolyte 1c formed therebetween. A plurality of axial holes may be formed in the fuel electrode 1a. This enables the fuel gas to flow therethrough. A water vapor retaining mechanism 6 may be inserted in each hole. Alternatively, FIG. 24 shows a cylindrical single cell including an inner air electrode 1b, an outer fuel electrode 1a, and an electrolyte 1c formed therebetween. A plurality of axial holes may be formed in the air electrode 1b. This enables air to flow therethrough. A water vapor retaining mechanism 6 may be attached to the outer circumferential surface of the single cell.

Each of the fuel cell systems according to the first and second embodiments includes the water vapor retaining mechanism (6, 11) that is disposed in the flow path of the fuel gas to be supplied to the fuel electrode 1a. It retains water vapor generated in the fuel electrode 1a during electric power generation by the cell 1. This allows the water vapor to be mixed with the fuel gas. Therefore, a separate water vaporizer for vaporizing water is unnecessary. Water vapor for reforming can be obtained efficiently using the simple structure.

Each of the water vapor retaining mechanism (6, 11) in the first and second embodiments includes the reforming catalyst enabling the reaction of the fuel gas to proceed to generate hydrogen. This enables the hydrogen, generated by the catalytic reaction using the reforming catalyst, to be supplied to the fuel electrode 1a. Therefore, a separate reformer, allowing the reaction of the fuel gas to proceed to generate hydrogen is unnecessary. Water vapor for reforming can be obtained efficiently using the simpler structure. In particular, the water vapor retaining mechanism 6 is formed from the sheet-shaped member with air permeability and flexibility. The water vapor retaining mechanism 6 can be easily subjected to processing such as bending and can be easily disposed in any appropriate position in the fuel cell system.

Each of the water vapor retaining mechanism 6 in the first and second embodiments is formed from the paper-like member. It includes inorganic fibers or organic fibers and supports the reforming catalyst allowing the reaction of the fuel gas to proceed to generate hydrogen. Therefore, the water vapor retaining mechanism, including the reforming catalyst, can be easily formed by utilizing, for example, a general-purpose wet paper making method. The water vapor retaining mechanism (6) in the first embodiment is disposed between the fuel channel 2a of the fuel electrode-side terminal 2 and the fuel electrode 1a. Therefore, the water vapor generated in the fuel electrode during electric power generation by the fuel cell can be mixed with the fuel gas reliably and smoothly. Thus, the fuel gas can be efficiently reformed. In the cell 1 in the second embodiment, the fuel electrodes 1a, the electrolytes 1c, and the air electrodes 1b are each formed into a tubular shape. The tubular water vapor retaining mechanism (6, 11) is formed along the inner or outer circumferential surface of the fuel electrode 1a. Therefore, the fuel and the air can be easily caused to flow by utilizing the tubular inner and outer spaces.

Next, a description will be given of experimental results showing technical superiority of the present disclosure.

A fuel cell system including a water vapor retaining mechanism 6 of 43×43×1.0 t (mm) was used as Example 1. A fuel cell system including a water vapor retaining mechanism 6 of 43×43×0.1 t (mm) was used as Example 2. A fuel cell system including no water vapor retaining mechanism 6 was used as a Comparative Example. Each of Examples 1 and 2 and the Comparative Example includes a cell with dimensions of 50×50 mm (electrode area: 40×40 (mm)).

For each of Examples 1 and 2 and the Comparative Example, methane ($CH_4$), used as the fuel gas, was caused to flow at a temperature of 750° C. and a flow rate of 17.3 (cc/min). The output (W) was measured with time, and experimental results shown in graphs in FIGS. 25(a) and 25(b) were obtained. FIG. 25(a) is a graph showing temporal changes in the output (from 0 to 15 hours) in Examples 1 and 2 and the Comparative Example. FIG. 25(b) is a graph showing temporal changes in the output from 0 to 0.05 hours in the Comparative Example. According to the experimental results, although the output decreased in about 1 minute in the Comparative Example, the output could be maintained for 15 hours or longer in Examples 1 and 2. It is inferred that, in the Comparative Example, one of the electrodes (the fuel electrode 1a) was broken by the fuel gas.

The present embodiments have been described, but the present disclosure is not limited to these embodiments. For example, it is only necessary that the water vapor retaining mechanism (6, 11) can retain the water vapor generated in the fuel electrode 1a, and the water vapor retaining mechanism (6, 11) may not include the reforming catalyst that allows the reaction of the fuel gas to proceed to generate hydrogen. The water vapor retaining mechanism 6 may not be the paper-like member and may be, for example, a porous block-like member, a foamed metal, a honeycomb member, etc. The water vapor retaining mechanism (6, 11) may include, in addition to the reforming catalyst, materials having other functions and properties.

The fuel cell system includes the water vapor retaining mechanism disposed in the flow path of the fuel gas to be supplied to the fuel electrode. It retains the water vapor generated in the fuel electrode during electric power generation by the cell. It allows the water vapor to be mixed with the fuel gas to be applied to systems having different outer shapes and having other functions imparted thereto.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A fuel cell system comprising:
   a cell capable of generating electric power, the cell includes:

a fuel electrode suppled with hydrogen obtained by reforming fuel gas;

an air electrode supplied with oxygen in air; and an electrolyte interposed between the fuel electrode and the air electrode and enabling oxygen ions generated from oxygen in the air supplied to the air electrode to pass through to the fuel electrode, and the fuel cell system further comprises a water vapor retaining mechanism disposed in a flow path of the fuel gas to be supplied to the fuel electrode, the retaining mechanism retains water vapor generated in the fuel electrode during electric power generation by the cell, and the retaining mechanism enables the water vapor to be mixed with the fuel gas.

2. The fuel cell system according to claim 1, wherein the water vapor retaining mechanism includes a reforming catalyst enabling a reaction of the fuel gas to proceed to generate hydrogen and enables the hydrogen, generated by the catalytic reaction using the reforming catalyst, to be supplied to the fuel electrode.

3. The fuel cell system according to claim 1, wherein the water vapor retaining mechanism includes a sheet-shaped member having air permeability and flexibility.

4. The fuel cell system according to claim 1, wherein the water vapor retaining mechanism includes a paper-like member including inorganic fibers or organic fibers and supports a reforming catalyst that enables a reaction of the fuel gas to proceed to generate hydrogen.

5. The fuel cell system according to claim 1, further comprising:

a fuel electrode-side terminal electrically connected to the fuel electrode including a fuel channel through which the fuel flows; and an air electrode-side terminal electrically connected to the air electrode including an air channel through which the air flows, wherein the water vapor retaining mechanism is disposed between the fuel channel of the fuel electrode-side terminal and the fuel electrode.

6. The fuel cell system according to claim 5, wherein the water vapor retaining mechanism has electrical conductivity and electrically connects the fuel electrode-side terminal to the fuel electrode.

7. The fuel cell system according to claim 1, further comprising:

a fuel electrode-side terminal electrically connected to the fuel electrode including a fuel channel through which the fuel flows; and an air electrode-side terminal electrically connected to the air electrode including an air channel through which the air flows, wherein the water vapor retaining mechanism is disposed in the fuel channel of the fuel electrode-side terminal.

8. The fuel cell system according to claim 1, wherein, in the cell, the fuel electrode, the electrolyte, and the air electrode are each formed into a tubular shape, and the water vapor retaining mechanism is formed into a tubular shape and extends along the inner or outer circumferential surface of the fuel electrode.

* * * * *